United States Patent
Müller et al.

(10) Patent No.: US 6,596,820 B2
(45) Date of Patent: Jul. 22, 2003

(54) LIGHT-RESISTANT THERMOPLASTIC POLYURETHANES, A PROCESS FOR THEIR PREPARATION AND THEIR USE

(75) Inventors: Hanns-Peter Müller, Odenthal (DE); Horst Gruttmann, Leverkusen (DE); Wolfgang Kaufhold, Köln (DE); Henricus Peerlings, Solingen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/105,736

(22) Filed: Mar. 25, 2002

(65) Prior Publication Data

US 2003/0060574 A1 Mar. 27, 2003

(30) Foreign Application Priority Data

Mar. 28, 2001 (DE) .......................................... 101 15 224

(51) Int. Cl.⁷ ............................................... C08G 18/30
(52) U.S. Cl. ........................ 525/458; 525/460; 525/440; 524/714
(58) Field of Search ................................ 525/458, 460, 525/440; 524/714

(56) References Cited

U.S. PATENT DOCUMENTS

| 4,261,946 A | 4/1981 | Goyert et al. ................ 264/211 |
| 5,491,211 A | 2/1996 | Rieck et al. .................. 528/60 |
| 5,824,738 A | 10/1998 | Humphrey et al. ......... 524/715 |

FOREIGN PATENT DOCUMENTS

| CA | 2292020 | 6/2000 |
| CA | 2307369 | 11/2000 |

*Primary Examiner*—Rachel Gorr
(74) *Attorney, Agent, or Firm*—Joseph C. Gil; Aron Preis

(57) ABSTRACT

A thermoplastic molding composition that contains a light-resistant aliphatic thermoplastic polyurethane elastomer is disclosed. The composition which largely contains of thermoplastic polyurethanes with high molecular weights and small amounts of thermoplastic polyurethanes with low molecular weights is useful for the preparation of a variety of articles and for use as sinterable composition in powder form.

8 Claims, No Drawings

LIGHT-RESISTANT THERMOPLASTIC POLYURETHANES, A PROCESS FOR THEIR PREPARATION AND THEIR USE

FIELD OF THE INVENTION

The present invention relates to thermoplastic compositions and more particularly to compositions containing light-resistant aliphatic polyurethane.

SUMMARY OF THE INVENTION

A thermoplastic molding composition that contains a light-resistant aliphatic thermoplastic polyurethane elastomer is disclosed. The composition which largely contains of thermoplastic polyurethanes with high molecular weights and small amounts of thermoplastic polyurethanes with low molecular weights is useful for the preparation of a variety of articles and for use as sinterable composition in powder form.

BACKGROUND OF THE INVENTION

Thermoplastic polyurethanes (TPUs) are very important industrial products because they have good elastomeric properties and may be thermoplastically processed. A wide range of variations in mechanical properties can be produced by suitable choice of the components. A review of TPUs, their properties and applications is given e.g. in *Kunststoffe* 68 (1978), p. 819–825, In *Kautschuk, Gummi, Kunststoffe* 35 (1982), p. 569–584 and in G. Becker, D. Braun, *Kunststoff-Handbuch*, vol. 7 "Polyurethane", Munich, Vienna, Carl Hanser Verlag 1983. A review of methods of preparation may be found in Plastverarbeiter 40 (1989).

TPUs are mostly built up from linear polyols (macrodiols) such as polyester or polyether diols, organic diisocyanates and short-chain, mostly difunctional, alcohols (chain extenders). They may be prepared continuously or batchwise. The best known methods of preparation are the strip process and the extruder process.

Aromatic diisocyanates are usually used to build up TPUs. However, aromatic TPUs are not light-resistant. More recently, aliphatic TPUs which have been known per se for a long time have become increasingly important because these do not yellow under the effects of light and, even when provided with black coloration, do not tend to change color or degree of glossiness during use.

U.S. Pat. No. 5,824,738 describes a light-resistant aliphatic TPU which is characterised by a very low degree of yellowing, even after intensive artificial weathering. However, this light-resistant TPU, based on $H_{12}$-MDI, has the disadvantage that it has only a relatively low resistance to heat.

EP-A 1 010 712 describes thermoplastic polyurethane elastomers which are both lightfast and thermally stable and which comply with the requirements for lighffastness and thermal stability due to their specific structure. The disadvantage of these lightfast TPUs is the low tendency of the molten TPUs to crystallise.

To produce decorative films and injection molded parts or in particular to produce flat materials from meltable, sinterable powders, flexible, light-resistant and thermally stable TPU raw materials are required by the user, which TPU materials flow well while being processed from the melt and crystallise rapidly on cooling. Products from the prior art comply with these requirements to only an inadequate extent.

Therefore, the object of the present invention was to provide aliphatic, flexible, lightfast TPUs which crystallise rapidly on cooling and which may be extruded, injection molded and blow molded without complications to make articles.

DETAILED DESCRIPTION OF THE INVENTION

This object may be achieved by the mixtures according to the invention described in detail below. Surprisingly, it was found that the addition of a low molecular weight TPU based on hexamethylene diisocyanate (HDI) to a molten, lighffast TPU leads to an early start to crystallisation during cooling and thus substantially simplifies the processing procedure.

Contrary to expectations, the good thermal stability of lighffast TPUs is not lost as a result of adding the low molecular weight TPU, although a reduction in viscosity does occur. Due to the use of the mixtures according to the invention described in greater detail below, the processability and the thermal stability are substantially improved.

Thus, the present invention provides light-resistant thermoplastic aliphatic polyurethane elastomer molding composition contains 80 to 98% relative to the weight of the composition of an aliphatic thermoplastic polyurethane (TPU Y), obtained, optionally in the presence of catalysts, from reacting A) 100 to 60 mol. %, preferably 100 to 80 mol. %, of hexamethylene diisocyanate (HDI) and 0 to 40 mol. %, preferably 0 to 20 mol. %, of other aliphatic diisocyanates, the mol % being relative to the moles of diisocyanates, B) polyols, preferably difunctional polyesterdiols with a number average molecular weight of 600 to 5000 g/mol, preferably 700 to 4200 g/mol, and C) chain extenders with an average molecular weight of 60 to 500 g/mol optionally with the addition of UV stabilisers D) in an amount of 0.4 to 0.9 wt. %, preferably 0.4 to 0.8 wt. %, with respect to [A)+B)+C)], and other conventional auxiliary substances and additives (F), wherein the ratio by equivalents of A) to B) is 1.5:1.0 to 6.0:1.0 and wherein the characteristic value (calculated by multiplying by 100 the ratio by equivalents of isocyanate groups to the sum of the hydroxyl groups from the polyol and the chain extending agents) is 95 to 105, and 2 to 20% relative to the weight of the composition of a low molecular weight thermoplastic polyurethane (TPU X) obtained from reacting G) hexamethylene diisocyanate (HDI), H) diols with a number average molecular weight of 62 to 300 g/mol and I) monofunctional alcohols as chain stoppers with a molecular weight of 32 to 300 g/mol, wherein the molar ratio of G) to H) is 2:1 to 1.05:1, preferably 1.7:1 to 1.2:1, and wherein the characteristic value (calculated by multiplying by 100 the ratio by equivalents of isocyanate groups from G) to the sum of he hydroxyl groups from H) and I)) is 99 to 101.

The TPU Y preferably has a number average molecular weight of 20,000 g/mol to 100,000 g/mol. The TPU X preferably has a number average molecular weight of 462 g/mol to 6000 g/mol.

The TPU Y particularly preferably has 13 to 21 wt. %, preferably 14 to 18 wt. % of rigid segments (calculated from the amount of diisocyanate A) and chain extender C), with respect to the total weight of TPU Y).

The invention also provides a process for preparing light-resistant, thermoplastic polyurethane elastomer mixtures characterised in that B) and C) are mixed continuously or batchwise and then intensively blended with A) and, before during or preferably after reaction of components A), B) and C) in an extruder, the separately prepared TPU X is added and the product thus obtained is optionally granulated.

The process according to the invention is preferably performed in such a way that the reaction to prepare the TPU Y is performed continuously in the presence of a catalyst.

The TPU X is preferably prepared without a catalyst.

Polyurethane elastomer mixtures according to the invention are used to produce molded items, extrudates, films and injection molded parts. Polyurethane elastomer mixtures according to the invention may be used as sinterable and free-flowing powders in an outstanding manner to produce flat materials and blown items.

Apart from 1,6-hexamethylene diisocyanate, other aliphatic and/or cycloaliphatic diisocyanates may be used as diisocyanate A) (see Houben-Weyl, "Methoden der organischen Chemie", vol. 20, Makromolekulare Stoffe, Georg Thieme Verlag, Stuttgart, New York, 1987, p. 1587–1593). Examples are ethylene diisocyanate, 1,4-tetramethylene diisocyanate, 1,12-dodecane diisocyanate, cyclobutane diisocyanate, cyclohexane-1,3 and -1,4 diisocyanate, and any mixture of these isomers, 1-isocyanato-3,3,5-trimethyl-5-isocyanatomethylcyclohexan, 2,4- and 2,6-hexahydrotoluylene diisocyanate, and any mixture of these isomers, hexahydro-1,3- and/or -1,4-phenylene diisocyanate, perhydro-2,4'- and/or 4,4'-diphenylmethane diisocyanate, and norbornane diisocyanate (e.g. U.S. Pat. No. 3,492,330). In addition to 1,6-hexamethylene diisocyanate (HDI), cycloaliphatic diisocyanates such as 1-isocyanato-3,3,5-trimethyl-5-isocyanatomethyl-cyclohexane (IPDI) and perhydro-2,4'- and/or 4,4'-dipenylmethane diisocyanate ($H_{12}$ MDI) are preferred.

Higher functional isocyanates, such as e.g. the isocyanurate of HDI (Desmodur® N 3300, Bayer AG) or the trimers of IPDI (Desmodur® Z 4300, Bayer AG) may optionally also be used. However, care must then be taken to ensure that an average functionality of two is not substantially exceeded so that the polyurethane may still be thermoplastically processed. Optionally, reaction partners with a higher functionality must be compensated for by also using other reaction partners with a functionality lower than two. Monofunctional isocyanates suitable for this purpose are e.g. stearyl isocyanate and cyclohexyl isocyanate.

Polyesterpolyols with a number average molecular weight between 600 and 5000 g/mol, preferably between 700 and 4200 g/mol, are preferably used as component B).

Suitable polyesters are e.g. reaction products of polyhydric, preferably dihydric and optionally also trihydric alcohols with polybasic, preferably dibasic carboxylic acids or their esterifiable derivatives. The polycarboxylic acids may be of an aliphatic, cycloaliphatic, aromatic and/or heterocyclic nature, e.g. substituted by halogen atoms and/or unsaturated.

Examples of such carboxylic acids and their derivatives which may be mentioned are: succinic acid, adipic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, maleic anhydride, fumaric acid, dimerised and trimerised unsaturated fatty acids optionally mixed with monomeric unsaturated fatty acids, dimethyl terephthalate and bisglycol terephthalate.

Suitable polyhydric alcohols are e.g. ethylene glycol, propylene glycol-1,2 and -1,3, butylene glycol-1,4 and -2,3, hexanediol-1,6, octanediol-1,8, neopentyl glycol, 1,4-bis-(hydroxymethyl)cyclohexane, trimethylolpropane, trimethylolethane, also di-, tri-, tetra- and higher polyethylene glycols, di- and higher polypropylene glycols and also di- and higher polybutylene glycols. Some of the polyester may have terminal carboxyl groups. Polyesters from lactones, e.g. ε-caprolactone, or from hydroxycarboxylic acids, e.g. ω-hydroxycaproic acid, may also be used. However, hydroxy-functional polyesters known from the field of fats chemistry such as e.g. castor oil and its transesterification products may also be used.

Other polyols may optionally be used in addition to polyester diols, for example polycarbonatediols, polyetherdiols and mixtures thereof. Suitable polycarbonates which contain hydroxyl groups are those of the type known per se which may be prepared e.g. by reacting diols such as propanediol-1,3, butanediol-1,4 and/or hexanediol-1,6, diethylene glycol, triethylene glycol, tetraethylene glycol or thiodiglycol with diaryl carbonates, e.g. diphenyl carbonate or phosgene (DE-A 1 694 080, 2 221 751).

In addition to the polesterpolyols and polycarbonatediols, mixtures of polyetherpolyols and polyesterpolyols and mixtures of polyetherpolyols and polycarbonatediols, each with a number average molecular weight between 600 and 5000 g/mol, preferably between 700 and 4200 g/mol, may also be used.

Suitable polyetherdiols may be prepared by reacting one or more alkylene oxides with 2 to 4 carbon atoms in the alkylene groups with a starter molecule which contains two bonded active hydrogen atoms. Suitable alkylene oxides are e.g.: ethylene oxide, 1,2-propylene oxide, epichlorhydrin and 1,2-butylene oxide and 2,3-butylene oxide. Ethylene oxide, propylene oxide and mixtures of 1,2-propylene oxide and ethylene oxide are preferably used. The alkylene oxides may be used individually, alternately one after the other or as mixtures. Suitable starter molecules are, for example: water, aminoalcohols such as N-alkyldiethanolamines, for example N-methyldiethanolamine and diols such as ethylene glycol, 1,3-propylene glycol, 1,4-butanediol and 1,6-hexanediol. Optionally, mixtures of starter molecules may also be used.

Furthermore, suitable polyetherdiols are polymerization products of hydroxyl group-containing tetrahydrofuran. Trifunctional polyethers, may also be used in amounts of 0 to 30 wt. %, with respect to the bifunctional polyether, but at most in an amount such that a thermoplastically processable product is produced. The substantially linear polyetherdiols have molecular weights of 600 to 5000, preferably 700 to 4200 g/mol. They may be used either individually or in the form of mixtures with each other. Hydroxyl group-containing polymerization products of tetrahydrofuran and polyetherdiols based on ethylene oxide and/or propylene oxide, e.g. Impact® Polyether from Bayer AG, are preferred.

Polyesters formed from adipic acid, butanediol, hexanediol and neopentyl glycol with an average molecular weight between 700 and 4200 g/mol are particularly preferred.

The chain extenders C) used are aliphatic diols and/or diamines with a molecular weight of 60 to 500 g/mol, preferably aliphatic diols with 2 to 14 carbon atoms, such as e.g. ethanediol, 1,6-hexanediol, diethylene glycol, dipropylene glycol and in particular 1,4-butanediol, or (cyclo) aliphatic diamines such as e.g. isophoronediamine, ethylene diamine, 1,2-propylenediamine, 1,3-propylenediamine, N-methyl-propylene-1,3-diamine, N,N'- dimethylethylenediamine. Diesters of terephthalic acid and glycols with 2 to 4 carbon atoms and hydroxyalkylene ethers of hydroquinone are also suitable. Mixtures of the chain extenders mentioned above may also be used. In addition, small amounts of triols may also be added, but at most in amounts such that a thermoplastically processable product is produced. 1,4-butanediol and 1,6-hexanediol are particularly preferred as chain extenders C).

Furthermore, conventional monofunctional compounds may be used in small amounts, e.g. as chain stoppers or mold release agents.

Examples which may be mentioned are alcohols such as octanol and stearyl alcohol or amines such as butylamine and stearylamine.

Chain extenders H) are aliphatic diols with a molecular weight of 62 to 300 g/mol, preferably aliphatic diols with 2 to 14 carbon atoms such as e.g. ethanediol, 1,6-hexanediol, 1,4-butanediol and 1,2-propanediol. 1,4-butanediol and 1,6-hexanediol, optionally mixed with up to 20 wt. % of chain extenders with an average molecular weight of 62 to 300 g/mol, are particularly preferably used as chain extenders H).

Chain stoppers I) are monofunctional alcohols with a molecular weight of 32 to 300 g/mol, preferably methanol, ethanol, propanol, 1-butanol, 1-hexanol, 2-ethylhexanol-1, cyclohexanol and 1-octadecanol.

When performing the process according to the invention the procedure is preferably such that the polyol/polyol mixture B) and the chain extenders C) are continuously mixed and then intensively blended with the diisocyanate/diisocyanate mixture A) (one-shot process) and before, during or preferably after reaction of these components to give TPU Y in an extruder, the separately prepared low molecular weight additive TPU X is added to the melt and the product obtained in this way is optionally granulated.

The reaction to give TPU Y is preferably performed in the presence of a catalyst.

Static mixers are preferably used for continuous mixing (see DE-C 23 28 795).

Thermoplastic polyurethanes TPU Y used according to the invention may also be prepared by the prepolymer process, wherein the diisocyanate/diisocyanate mixture is first mixed with the polyol/polyol mixture and reacted to produce a prepolymer and then chain extending is performed in a continuous manner.

A catalyst is preferably used during continuous preparation of the thermoplastic polyurethanes in accordance with the extruder or strip process. Suitable catalysts are tertiary amines such as e.g. triethylamine, dimethylcyclohexylamine, N-methylmorpholine, N,N'-dimethylpiperazine, 2-(dimethylaminoethyl)-ether, diazabicyclo-[2.2.2]-octane and the like which are known from the prior art and conventionally used, and also in particular organometallic compounds such as titanium esters, iron compounds, tin compounds, e.g. tin diacetate, tin dioctate, tin dilaurate or the tindialkyl salts of aliphatic carboxylic acids such as dibutyltin diacetate, dibutyltin dilaurate or the like.

Preferred catalysts are organometallic compounds, in particular titanium esters, iron or tin compounds. Dibutyltin dilaurate is very particularly preferred.

In addition to the reaction components, UV stabilizers and catalysts used according to the invention, further auxiliary substances and additives may also be added. The following may be mentioned, for example: lubricants such as esters of fatty acids, their metal soaps, fatty acid amides and silicone compounds, antiblocking agents, inhibitors, stabilisers to protect from hydrolysis, heat and discoloration, flameproofing agents, colorants, pigments, inorganic fillers and reinforcing agents which are prepared according to the prior art and may also be provided with a size. More detailed data on the auxiliary substances and additives may be found in the specialist literature, for example J. H. Saunders, K. C. Frisch: "High Polymers", vol. XVI, Polyurethane, parts 1 and 2, Interscience Publishers 1962 and 1964, R. Gächter, H. Müller (eds.): Taschenbuch der Kunststoff-Additive, 3rd edition, Hanser Verlag, Munich 1989 or DE-A-29 01 774.

The lubricants are preferably used in amounts of 0.1 to 1.0 wt. %, with respect to A)+B)+C). Antioxidants are preferably used in amounts of 0.1 to 0.7 wt. %, with respect to A)+B+C).

The additive TPU X used according to the invention is preferably prepared separately in a suitable stirring apparatus. The procedure is then as follows:

Hexamethylene diisocyanate (HDI) G) is initially introduced and first the chain stopper 1) is added dropwise, at an elevated temperature. After completion of reaction (subsidence of exothermic reaction) the chain extender H) is added and, optionally, the temperature is raised. The mixture is then stirred until the melt is NCO-free (IR checks). In general, the end phase of the reaction is performed at 150 to 200° C. and the ratio of the amounts is chosen so that 0.5 to 0.95 moles of chain extender H) are added to one mole of the initially introduced diisocyanate G).

The low-viscosity melt is poured out of the reaction vessel and solidified by cooling while crystallizing. The product is crushed and may then also be milled.

Another possibility comprises applying the low-viscosity melt to a cooling belt or a cooling roll and crushing, granulating and/or milling, after solidifying.

The TPU Y used according to the invention is preferably prepared continuously, wherein the polyol/polyol mixture B) and the chain extender C) are continuously mixed (e.g. using a static mixer) and this mixture is mixed and reacted with HDI A) (e.g. using a static mixer). In a further step, the second diisocyanate (if present) A), which is different from HDI, is blended into the mixture. Blending in the second diisocyanate may take place e.g. in a static mixer, a tubular mixer or else in an extruder. The ratio of amounts is chosen so that preferably flexible, light-resistant TPU Y is produced, preferably with a 13–21 wt. %, particularly preferably with 14–18 wt. % proportion of rigid segments, the percents being relative to the weight of TPU Y. The rigid segment in TPUs is usually calculated from the amounts of diisocyanate and chain extender used, with respect to the total weight of the TPU.

The polyol/chain extender mixture [B)+C)] and diisocyanate A) should preferably have a temperature difference before mixing of <20° C., preferably <10° C., particularly preferably <5° C. The absolute temperatures of the raw materials should preferably be between 60° C. and 150° C., particularly preferably between 80° C. and 120° C. The second, different from HDI, diisocyanate A), if present, may also first be reacted with the polyol/chain extender mixture [B)+C)]. Then HDI A) is admixed and reacted.

Addition of the additive TPU X may take place after polymerization by compounding or else during polymerization. Antioxidants and UV stabilizers, which are preferably dissolved in polyol B), may also be added during polymerization. However, lubricants and stabilizers may also be added during extrusion, for example in the second section of the screw.

Light-resistant TPU blends according to the invention may be used to produce molded articles, in particular to prepare extrudates (e.g. films) and injection molded parts. They are preferred in particular for use in car interiors because of their properties. Furthermore, TPUs according to the invention may be used as sinterable powders for producing flat materials and blown items.

Light-resistant blends according to the invention made from thermoplastic polyurethane elastomers, 80 to 98 wt. % of which contain an aliphatic TPU Y, preferably with a number average molecular weight of 20 000 g/mol to 100 000 g/mol and 2 to 20 wt. % of which contain a separately prepared additive TPU X, preferably with a number average molecular weight of 462 g/mol to 6000 g/mol, are characterised, as compared with products from the prior art, by a number of advantageous properties:

1. The tendency of mixtures according to the invention to crystallize is accelerated so that extrudable, injectable and blowable products with rapid crystallisation are obtained on cooling. Crystallization has generally started to take place at 140° C.
2. TPU mixtures according to the invention, as compared with non-modified TPUs from the prior art, have a lower MFI (melt flow index).
3. TPU mixtures according to the invention, as compared with TPUs from the prior art, have an increased resistance to heat and an elevated modulus.
4. On adding the TPU X to the TPU Y, the hardness of the TPU mixture is barely altered so that overall flexible lightfast TPU mixtures with excellent processability from the melt and rapid mold release properties are obtained.
5. Light-resistant TPU blends according to the invention may also be used in novel applications, e.g., after formulating with active substances, to control parasites or in the surroundings of animals.

The invention is explained in more detail by the following examples.

EXAMPLES

Example 1

(TPU X)

84 g (0.5 mol) hexamethylene diisocyanate were initially introduced and 18.4 (0.4 mol) ethanol (chain stopper) were added dropwise at 80 to 90° C. over the course of one hour. Then 27 g (0.3 mol) 1,4-butanediol are added dropwise over the course of one hour. The temperature rose to 160° C. Stirring was continued at 160° C. (about 30 min) until the melt no longer contained any NCO (IR spectroscopy). After pouring onto a Teflon sheet, the melt solidified very rapidly. The melting point was 150 to 156° C.

Example 2

(TPU Y)

216.68 g (0.127 mol) of a polyester made from adipic acid and 1,6-hexanediol neopentyl glycol (in the molar ratio 0.65:0.35) with an average molecular weight of 1706 g/mol and 2 wt. % of OH groups and 107.16 g (0.054 mol) of a polyester made from adipic acid and ethylene glycol with an average molecular weight of 1984 g/mol and 1.7 wt. % of OH groups were mixed and dried for 30 minutes at 120° C. and 15 mbar. The mixture was heated to 160° C. under nitrogen and then 8.91 g (0.099 mol) 1,4-butanediol and 47.12 g (0.28 mol) hexamethylene diisocyanate were added one after the other. The reaction was exothermic and the temperature rose to 180° C. 10 minutes after adding the isocyanate, the melt was poured onto a Teflon sheet and post-heated for 20 hours at 80° C. in a drying cabinet. The product was NCO-free (IR spectroscopy). A flexible, light-resistant TPU Y with a Shore A hardness of about 72 (test method DIN 53505) was obtained in this way.

Example 3

(TPU blend)

1900 g of the TPU Y from example 2 were premixed dry with 100 g of the TPU X from example 1 after crushing to give irregular granules and homogenized at 120–140° C. in a HZSK laboratory extruder from the Haake Co. The extrudate emerging from the extruder was cooled under water, processed to give cylindrical granules with a length of about 2 mm using extrudate granulation and then dried for 1 h at 60° C. in a vacuum drying cabinet.

Example 4

(TPU blend)

The same procedure as described in example 3 was used, but with the difference that 1980 g of TPU Y from example 2 and 20 g of TPU X from example 1 were used for homogenizing in the extruder.

Physical tests:

Thermogravimetric analysis (TGA):

Principle: The change in weight is followed while heating in a defined atmosphere (here: nitrogen); the amount and rate of change in weight were determined as a function of temperature. The relative loss of weight (with respect to 100% initial weight) was evaluated.

TGA instrument: TGS-7 Thermoscales (Perkin-Elmer).

Heating from room temperature to +600° C., rate of heating 20K/min; under nitrogen, amounts weighed out initially about 4.4 mg and 5.1 mg sample weights in an open Pt crucible.

Standard evaluation: relative decrease in weight, volatilization, decomposition.

Differential calorimetry: DSC

Principle: Measurement of heat tonality during physical transitions (glass transition, melting, evaporating) and chemical changes (oxidation, cross-linking). The difference in the amounts of heat supplied to a test substance and to an inert material (reference) is measured as a function of temperature: the sample and reference were subjected to the same controlled temperature/time programme.

DSC instrument: Differential Scanning Calorimeter DSC-2 (Perkin-Elmer).

Two heating procedures in sequence from −100° C. to +200° C.; rate of heating 20K/min, conditioning at end of 1st heating (10 min at 200° C.), slow cooling in calorimeter at 10 K/min to the starting temperature of −100° C., under nitrogen, amounts weighed out 21 mg (+/−1 mg) in standard capsules.

Standard evaluation: Glass transition temperature (glass transition temperature Tg=middle of glass step), Melting characteristics (melting points $T_m$ [°C.] as peak maxima, heats of fusion □H [J/g] as integral between base line and the stretch of the curve on the measured curve restricted by a defined temperature interval).

To determine recrystallization (DSC method), sample sheets (18×18 cm×1 cm thick) were produced from the granules in examples 2, 3 and 4. Using DSC tests, the effect of TPU X on recrystallisation was determined.

Results:

The volatilization and decomposition behavior of all the samples was determined thermogravimetrically (TGA). For this, the samples were heated from room temperature to 600° C. in a thermoscale and the relative loss in weight (standardized with respect to the starting weight) was determined. The TGA curves obtained for the samples differ very little. All three samples were stable to decomposition up to about 260° C., thermal decomposition started above 260° C. The amount of volatile substances at 200° C. was less than 0.5%. This relatively small loss in weight was not a critical factor with regard to DSC heating. DSC heating up to 200° C. was therefore possible.

Measurement program:
1. Samples placed in the DSC at room temperature.
2. Rapid cooling (320 K/min) to the starting temperature of −100° C.
3. Heating from −100° C. to +200° C. at a constant rate of heating of 20 K/min.
4. 10 minutes isothermal conditioning at 200° C. to melt the crystalline fractions.
5. Slow cooling (10 K/min) from +200° C. to −100° C.
6. Renewed heating from −100° C. to +200° C. at a constant rate of heating of 20K/min.

The samples from examples 2, 3 and 4 were substantially the same during the 1st heating procedure, i.e. in the same state as delivered. The glass transition temperature was −49° C. A structured melting range was found between room temperature and about 150° C., this was widened to about 180° C. in the case of the sample from example 3.

After isothermal conditioning (10 min at 200° C.), the samples were cooled slowly and the cooling behaviour recorded. The TPU Y sample from example 2 showed no recrystallisation effects during cooling. The sample from example 4 showed only a small effect at 44.2° C. (−3.166 J/g). The sample from example 3, however, showed a pronounced effect which started at about 140° C. (−7.188 J/g).

The subsequent second heating procedure provided pointers to the degree of crystallisation achieved during cooling. The TPU Y from example 2 showed an endothermic effect of +6.575 J/g at 105.9° C.

The sample from example 4 produced a similar shaped curve as TPU Y, but with the difference that the endothermic effect at 112.1° C. had a value of +4.665 J/g. The mixture of TPU X and TPU Y according to the invention from example 3 showed a pronounced endothermic effect at 127° C. of +11.474 J/g.

Accordingly, under the conditions chosen for conditioning and cooling, the sample from example 3 could be almost completely crystallised.

Dynamic mechanical analysis (DMS)

Measurements of the complex E* modulus were performed on samples of TPU Y from example 2 and the mixture of TPU X and TPU Y according to the invention from example 3.

Rectangles (30 mm×10 mm×1 mm) were punched out of the injection molded sheets. These test sheets were periodically subjected to very small deformations under a constant preliminary load, optionally depending on the storage modulus, and the force acting on the restraint was measured as a function of the temperature and the frequency of application. The additionally applied preliminary load served to keep the sample under adequate tension at times of negative deformation amplitude.

The softening temperature T was determined at E'=2M Pa as a characteristic temperature for heat resistance.

The DMS measurements were performed with a Seiko DMS model 210 from the Seiko Co. at 1 Hz in the temperature range from −150° C. to +200° C. with a rate of heating of 2° C./min.

Results:

When measuring the complex E* modulus, both modulus curves showed a narrow glass transition at −48° C. and a subsequent pronounced modulus plateau, although this lay at different levels for the two samples. At 60° C., there was a clear modulus step in both modulus curves and subsequent 2-step softening of the samples. The sample according to the invention from example 3 had a modulus plot which was clearly the higher and thus demonstrated the higher heat resistance of the sample.

| TPU Y (example 2) | | TPU X/TPU Y (example 3) | |
|---|---|---|---|
| TG | −48° C. | TG | −48° C. |
| E' [10° C.] | 41 MPa | E' [10° C.] | 71 MPa |
| E' [36° C.] | 35 MPa | E' [36° C.] | 64 MPa |
| T [2 MPa] | 101° C. | T [2 MPa] | 117° C. |

Melt flow index (MFI)

The melt flow indices of samples 2 and 3 were determined in accordance with DIN 53 735/B, preheating time 15 min.

|  | Example 2 TPU Y | Example 3 TPU X/TPU Y |
|---|---|---|
| Melt flow index (MFI 180/5) | 1 g/10 min | 12 g/10 min |

Examples 5 to 8

The TPU Y was prepared continuously as follows:

The mixture of polyol B), chain extender C) and dibutyltin dilaurate was heated to about 110° C. with stirring in a tank and heated together with the corresponding diisocyanate (see table 1) which had been heated to about 110° C. in a heat exchanger, mixed intensively using a static mixer from the Sulzer Co. (DN 6 with 10 mixing elements and a rate of shear of 500 s$^{-1}$) and then fed to the inlet to a screw (ZSK 32).

If required, the second, different from HDI, diisocyanate was introduced into the 1st zone of the screw (ZSK 32). The entire mixture reacted in the extruder at 120 to 200° C.

TABLE 1

Composition of TPU Y 5 to 8:

| TPU Y | HDI mol/g | IPDI mol/g | HPI/IPDI mol. %/mol. % | DE 2000 mol/g | PE 225B mol/g | PE 170 HN mol/g | 1,4-BDO mol/g | 1,6-HDO mol/g | DBTL ppm | KZ |
|---|---|---|---|---|---|---|---|---|---|---|
| 5 | 2.8/470 | — | 100/0 | — | 0.6/1350 | 0.9/1530 | 0.65/59 | 0.65/77 | 40 | 100 |
| 6 | 2.7/454 | 0.3/67 | 90/10 | — | — | 1.5/2550 | 1.5/135- | — | 40 | 100 |
| 7 | 2.7/454 | 0.3/67 | 90/10 | 0.75/1500 | — | 0.75/1275 | 1.5/135 | — | 40 | 100 |
| 8 | 5.18/870 | — | 100/0 | 1.0/2000 | — | 2.35/3995 | 1.83/165 | — | 40 | 100 |

The amounts of DBTL are given with respect to the polyol mixture.

| | |
|---|---|
| DBTL | dibutyltin dilaurate |
| DE 2000 | polyethandioladipate with a number average molecular weight $M_n$ of 2000 g/mol |
| PE 225B | polybutandioladipate with a number average molecular weight $M_n$ of 2250 g/mol |
| PE 170 HN | polyester made from adipic acid, hexanediol and neopentyl glycol (in the molar ratio 0.65:0.35) with a number average molecular weight $M_n$ of 1700 g/mol |
| 1,4-BDO | 1,4-butanediol |
| 1,6-HDO | 1,6-hexanediol |
| HDI | hexamethylene diisocyanate |
| IPDI | isophorone diisocyanate |
| KZ | characteristic value |

In the last zone of the ZSK32, 5 wt. % of TPU X was added to 95 parts by weight of TPU Y (5 to 8) and the extrudate emerging from the screw was granulated, after water-cooling. All blends according to the invention containing TPU X and TPU Y exhibited rapid crystallization during cooling so they could be granulated without any problem.

To improve the properties, blends according to the invention may contain additional additives. The following are suitable:

| | |
|---|---|
| Irganox ® 1010 | tetrakis[methylene-(3,5-di-tert.-butyl-4-hydroxy--hydrocinnamate)]-methane (Ciba-Geigy) |
| Irganox ® 245 | ethylenebis-(oxyethylene)-bis-(3-tert.-butyl-4-hydroxy-5-methyl-hydrocinnamate) (Ciba-Geigy) |
| Tinuvin ® 328 | 2-(2'-hydroxy-3',5'-di-tert.-amylphenyl)benzotriazole (Ciba-Geigy) |
| Tinuvin ® 622 | dimethylsuccinate polymer with 4-hydroxy-2,2,6,6-tetramethyl-1-piperazine ethanol (Ciba-Geigy) |
| Loxiol ® G78 | Stearic acid (Hoechst) |
| Stabaxol ® P 200 | aromatic polycarbodiimide (Rhein-Chemie) |
| Zinc stearate | Aldrich Co. |

Comparison Example 9

The same procedure was used as described in example 8, but with the difference that no TPU X1 was added to the TPU Y8. After completion of reaction on the ZSK 32 screw at 140° C. and with an exit temperature of 120° C., a tacky TPU Y8 extrudate was obtained which could not be granulated, despite intensive water cooling.

Example 10

(TPU X)

Composition of various TPU Xs

Preparation of TPU Xs 2 to 9 was performed in accordance with the instructions for preparing TPU X1 in example 1.

TABLE 2

| | Chain stopper | Chain extender | diisocyanate | Mn (calc.) | Melting point |
|---|---|---|---|---|---|
| TPU X1 (ex. 1) | 2 mol ethanol | 1.5 mol 1,4-BDO | 2.5 mol HDI | 647 g/mol | 150–156° C. |
| TPU X2 | 2 mol 1-hexanol | 1.5 mol 1,6-HDO | 2.5 mol HDI | 801 g/mol | 149–153° C. |
| TPU X3 | 2 mol ethylhexanol | 5 mol 1,4-BDO | 6 mol HDI | 1718 g/mol | 160–164° C. |
| TPU X4 | 2 mol 1-butanol | 1.5 mol 1,4-BDO | 2.5 mol HDI | 703 g/mol | 159–163° C. |
| TPU X5 | 2 mol 1-hexanol | 1.5 mol 1,4-BDO | 2.5 mol HDI | 759 g/mol | 164–167° C. |
| TPU X6 | 2 mol ethanol | 1.5 mol 1,6-HDO | 2.5 mol HDI | 689 g/mol | 145–148° C. |
| TPU X7 | 2 mol ethylhexanol | 10 mol 1,4-BDO | 11 mol HDI | 3008 g/mol | 170–174° C. |
| TPU X8 | 2 mol ethylhexanol | 20 mol 1,4-BDO | 21 mol HDI | 5588 g/mol | about 180° C. |
| TPU X9 | 2 mol ethanol | 1 mol 1,6-HDO | 2 mol HDI | 546 g/mol | 138–142° C. |

TPU X was prepared in the same way as described in example 1, but with the difference that no chain extender was added.

| Comparison example (inactive TPU X) | | | | |
|---|---|---|---|---|
| | Chain stopper | Diisocyanate | $M_n$ (calc.) | Melting point |
| TPU X 10 (comparison) | 2 mol ethanol | 1 mol HDI | 260 g/mol | 80–82° C. |

Example 11

Tests to determine the activity of TPU X in TPU Y

The components TPU X and TPU Y were blended with a wooden rod in the ratio by amounts given in tables 3 and 4 in a hot metal mold at 180° C. to give a homogeneous melt.

The melt was then applied hot to a Teflon sheet provided with a 2 mm thick metal frame, covered with another Teflon sheet and compressed manually to give a 2 mm thick irregular film. After 20 seconds the material was removed from the mold and the time to freedom from tackiness was measured (film to film). The metal frame and the Teflon sheets were at room temperature.

TABLE 3

Comparison tests

| Test | TPU Y | TPU X | Time to freedom from tackiness |
|---|---|---|---|
| A | 100% from example 2 | — | 112 sec. |
| B | 95% from example 2 | 5% TPU X 10 | >180 sec. |

TABLE 4

Tests according to the invention

| Test | TPU Y | TPU X | Time to freedom from tackiness |
|---|---|---|---|
| C | 95% from example 2 | 5% TPU X1 (example 1) | 33 sec. |
| D | 95% from example 2 | 5% TPU X3 | 32 sec. |
| E | 97% from example 2 | 3% TPU X3 | 34 sec. |
| F | 98% from example 2 | 2% TPU X3 | 38 sec. |
| G | 99% from example 2 | 1% TPU X3 | 53 sec. |
| H | 95% from example 2 | 5% TPU X7 | 34 sec. |
| I | 95% from example 2 | 5% TPU X8 | 34 sec. |
| K | 95% from example 2 | 5% TPU X9 | 58 sec. |

Table 3 shows, in test A, the "zero value" for the TPU Y without the addition of TPU X. Test B makes it clear that a TPU X which has been prepared without a chain extender is not suitable as a blend partner.

In contrast table 4 shows, in tests C to K, how the addition of TPU X has the effect of shortening the time to freedom from tackiness in the case of blends according to the invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A light resistant thermoplastic molding composition comprising 80 to 98% relative to the weight of the composition of polyurethane Y (TPU Y) prepared by reacting
    A) 100 to 60 mol. % of hexamethylene diisocyanate (HDI) and 0 to 40 mol. % of one or more aliphatic diisocyanate different from HDI,
    B) at least one polyol having number average molecular weight of 600 to 5000 g/mol and
    C) at least one chain extender having an average molecular weight of 60 to 500 g/mol, said TPU Y optionally containing D) one or more UV stabilizer in an amount of 0.4 to 0.9% the % being relative to the total weight of A)+B)+C), wherein the ratio by equivalents of A):B) is 1.5:1.0 to 6.0:1.0 and wherein the characteristic value is 95 to 105, and 2 to 20% relative to the weight of the composition of a low molecular weight thermoplastic polyurethane (TPU X) prepared by reacting
    G) hexamethylene diisocyanate (HDI),
    H) at least one diol having number average molecular weight of 62 to 300 g/mol and
    I) at least one monofunctional alcohol having a molecular weight of 32 to 300 g/mol as a chain stopper, wherein the molar ratio of G) :H) is 2:1 to 1.05:1 and wherein the characteristic value is 99 to 101.

2. The thermoplastic molding composition of claim 1 wherein TPU Y has a number average molecular weight of 20 000 to 100 000 g/mol and TPU X has a number average molecular weight of 462 to 6000 g/mol.

3. The thermoplastic molding composition of claim 1 wherein the TPU Y contains 13 to 21% relative to the weight of TPU Y, of rigid segments.

4. A process for producing the light-resistant thermoplastic molding composition of claim 1 comprising
    (i) mixing said B) with said C) to produce a mixture and
    (ii) intensively blending said mixture with said A) to produce a blend and
    (iii) reacting said blend in an extruder, and
    (iv) introducing TPU X to the extruder before, during or after the reaction of said (iii) to obtain a composition, and optionally
    (v) granulating the composition obtained in (iv).

5. The process according to claim 4, wherein said reacting the blend is continuous and in the presence of a catalyst.

6. The process according to claim 4, wherein TPU X is a product of an un-catalyzed reaction.

7. A method of using the composition of claim 1 comprising molding an article.

8. A method of using the composition of claim 7 comprising obtaining the composition in the form of a free-flowing powder and sintering said powder.

* * * * *